(12) United States Patent
Grooms

(10) Patent No.: US 11,802,066 B2
(45) Date of Patent: Oct. 31, 2023

(54) GREYWATER TREATMENT SYSTEM

(71) Applicant: Rickie Dale Grooms, Graham, NC (US)

(72) Inventor: Rickie Dale Grooms, Graham, NC (US)

(*) Notice: Subject to any disclaimer, the term of this patent is extended or adjusted under 35 U.S.C. 154(b) by 29 days.

(21) Appl. No.: 17/393,871

(22) Filed: Aug. 4, 2021

(65) Prior Publication Data

US 2023/0044004 A1    Feb. 9, 2023

(51) Int. Cl.
| | |
|---|---|
| *C02F 9/00* | (2023.01) |
| *C02F 103/00* | (2006.01) |
| *C02F 1/68* | (2023.01) |
| *C02F 1/00* | (2023.01) |
| *C02F 1/66* | (2023.01) |

(52) U.S. Cl.
CPC ............ *C02F 9/00* (2013.01); *C02F 1/001* (2013.01); *C02F 1/66* (2013.01); *C02F 1/68* (2013.01); *C02F 2103/002* (2013.01); *C02F 2209/03* (2013.01); *C02F 2209/06* (2013.01); *C02F 2209/245* (2013.01); *C02F 2301/04* (2013.01); *C02F 2301/066* (2013.01)

(58) Field of Classification Search
None
See application file for complete search history.

(56) References Cited

U.S. PATENT DOCUMENTS

| | | | | |
|---|---|---|---|---|
| 5,771,886 | A * | 6/1998 | Maire et al. | A62B 18/084 128/201.19 |
| 5,772,886 | A * | 6/1998 | Bettle | C02F 3/1294 |
| 5,885,478 | A * | 3/1999 | Montgomery et al. | C04B 18/16 252/175 |
| 8,608,138 | B2 | 12/2013 | Cooke | |
| 2009/0282977 | A1* | 11/2009 | Koss | C01C 1/26 95/199 |
| 2010/0047414 | A1* | 2/2010 | Terranova | A23B 7/152 426/333 |
| 2016/0326017 | A1* | 11/2016 | Cross et al. | B21D 37/18 |
| 2017/0113952 | A1* | 4/2017 | Stephenson et al. | C02F 1/727 |
| 2017/0144892 | A1 | 5/2017 | McCluskey et al. | |
| 2020/0282595 | A1* | 9/2020 | Monkman et al. | C02F 1/66 |
| 2021/0179491 | A1* | 6/2021 | Peinado et al. | B28C 9/0454 |
| 2021/0253456 | A1* | 8/2021 | Johnson | B01D 53/1475 |

OTHER PUBLICATIONS

Yelton, "Treating Process Water," The Concrete Producer (The Aberdeen Group, Publication #J970441), (Year: 1997).*
Raynbird Limited, Turn greywater into clean water, Aloaqua, 2021.

* cited by examiner

*Primary Examiner* — Chester T Barry
(74) *Attorney, Agent, or Firm* — James G. Passe; Passe Intellectual Property, LLC

(57) ABSTRACT

A system and method for removing contaminates from greywater that uses carbon dioxide ($CO_2$) and a system that adjusts the pH between 6 and 9. The filtration system is cost effective, quick, and easy to use, resulting in purified water.

3 Claims, 2 Drawing Sheets

GREYWATER TREATMENT SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to greywater treatment for the real time treatment of pH and removal of contaminants from greywater. More specifically, it relates to the removal of contaminates and real time adjusting of pH in greywater using carbon dioxide ($CO_2$) and pressure.

Description of Related Art

Greywater, or sullage, refers to the wastewater that is generated in households or office buildings from streams without fecal contamination, i.e., all streams, construction sites, ready mixed concrete plants, except for the wastewater from toilets. Sources of greywater include sinks, showers, baths, washing machines, or dishwashers.

Greywater is used for non-potable activities such as laundry, irrigation, and toilet flushing. However, if greywater is going to be used efficiently, such greywater needs to be treated to remove contaminates in order for it to be recycled in most applications. There have been several methods which have attempted to clean greywater such as biological, gas, holding ponds, and enzymatic treatments, but these methods are very costly and take a great deal of time to complete the process. An inexpensive, quick, and easy to use system for purifying greywater would make greywater recycling a net positive activity.

BRIEF SUMMARY OF THE INVENTION

The present invention relates to the discovery that bubbling $CO_2$ into greywater, concentrating the $CO_2$ in the solution, followed by separation and filtration, produces a water with a pH between 6 and 9 and is clean enough to use in the ready mixed concrete industry, or to environmentally pump off property within EPA specifications for water runoff to streams, rivers, city sewers, etc. In some cases, it may be potable, depending on the greywater content.

Accordingly, in one embodiment, there is a system for the purification of greywater comprising:
a) a large particle filter;
b) a small fines filter;
c) a $CO_2$ source;
d) a first bubbling chamber to receive $CO_2$ from the $CO_2$ source, which produces a carbonic acid;
e) a pressure chamber to separate the solids from the carbonated greywater and retaining the carbonic acid state by keeping a pressure of between about 1 and 10 psig; and
f) a second bubbling chamber to suspend the fines solids from the treated greywater.

In another embodiment, there is a method for the treatment of greywater comprising:
a) filtering the greywater with a large particle filter;
b) adding the filtered greywater to a bubbling chamber;
c) using a first single pass bubbling $CO_2$ into the bubbling chamber until the filtered greywater is saturated with $CO_2$ to a pH between 6 and 9 prior to entering a pressure chamber;
d) transferring the saturated greywater to the pressure chamber at a pressure of about 1 to 10 psig until carbonic acid is created to suspend a majority of solids in the water;
e) transferring the carbonic acid greywater and the suspended solids to a second bubbling chamber and bubbling $CO_2$ to suspend any remaining solids in the water; and
f) filtering the suspended solids through a small fines filter.

DETAILED DESCRIPTION OF THE INVENTION

Figure 1:
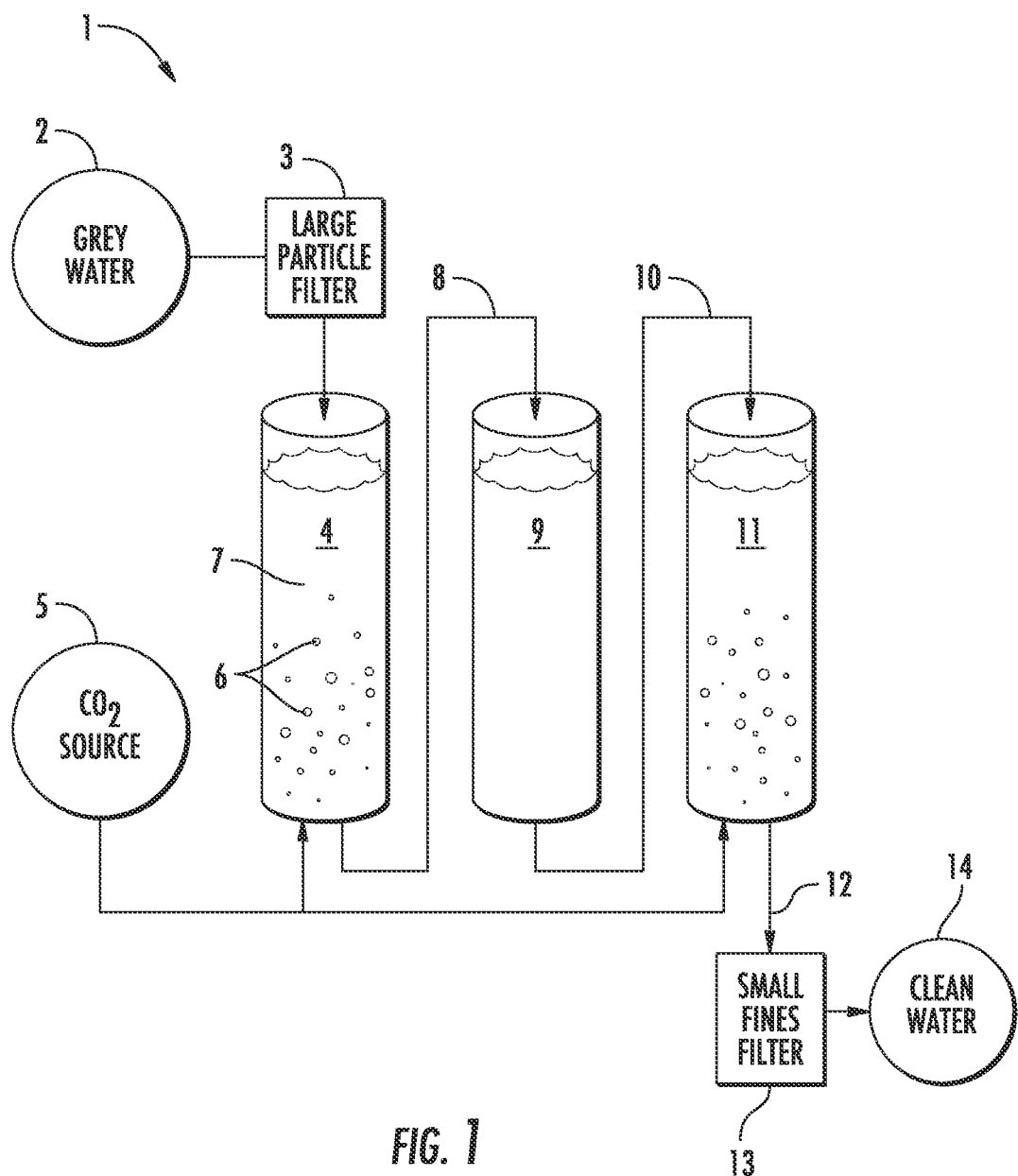
FIG. 1 is a graphic of the system of the present invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "purification" refers to the removal of contaminants in greywater that are part of the water that makes it greywater. Under ideal conditions, it means that the greywater is cleaned sufficiently to become potable water, but at least clean enough to use in other applications.

As used herein, the term "greywater" refers to wastewater that is generated in households or office buildings from streams without fecal contamination, i.e., all streams, except for the wastewater from toilets. Sources of greywater include sinks, showers, baths, washing machines, or dishwashers. During the process, the greywater can be filtered at ambient temperatures or between -10° F. and 125° F.

As used herein, the term "large particle filter" refers to a water filter that is capable of filtering out particles greater than about 10 microns.

As used herein, the term "small fines filter" refers to a water filter that is capable of filtering out particles less than 1-10 microns.

As used herein, the term "first bubbling chamber" refers to a chamber that can hold a quantity of greywater and then have $CO_2$ gas bubbled throughout the greywater until 90% saturation is achieved.

As used herein, the term "pressure chamber" refers to a chamber for placing the carbonated greywater. The pressure chamber is kept under pressure at between about 1 and 10 psi, i.e., psig. This supersaturates the greywater with $CO_2$ creating carbonic acid, which breaks the bond with solids from the water.

As used herein, the term "second bubbling chamber" refers to a chamber for placing the supersaturated greywater in the bubbling $CO_2$ to separate clean water from solids. In one embodiment, two or more of the chambers could be the same chamber with just a different process occurring.

As used herein, the term "$CO_2$ source" refers to a source of $CO_2$ in the gaseous form that can be injected into the bubbling chamber in order to carbonate the water. Any source is contemplated. In one embodiment, the $CO_2$ is obtained by carbon capture technology.

The process of creating clean water starts with filtering large particles and fines from the greywater. This can be done at any point in the process, but in one embodiment, the large particle filtration is the first step and the small fines (particle) filtration is last after passing through the system. Greywater is placed into a bubbling chamber, and gaseous $CO_2$ is bubbled through the greywater until it reaches the specific saturation of 6.4 pH or true carbonic acid ($H_2CO_3$). The carbonated greywater is then transferred to a pressure chamber and flows through the pressure chamber at a rate of 30 to 150 gallons per minute at about 1 to 10 psi, i.e., psig depending on the size of the pressure chamber and pump. The process of forcing the carbonic acid under pressure creates a steady stream of micro-implosions that generates just enough energy to separate the solids from the water. The water then passes through the third chamber where $CO_2$ is injected at 6 psi, i.e., psig to bubble and break the chemical bond between the water and any fines solids that did not separate in the reaction chamber, which is then run through the final fines filtration of 1 micron and other carbon based filters, sometimes including activated charcoal. The water can be manually filtered (any filter pore size) one more time resulting in clean water.

Drawings

Now referring to the drawings, FIG. 1 is a graphic representation of the system 1 of the present invention. In this view, greywater 2 is passed through a large particle filter 3 before being placed in the first bubbling chamber 4. A gaseous $CO_2$ source 5 bubbles $CO_2$ 6 though greywater in the bubbling chamber 4 to form a saturated carbonated solution at ambient pressures. The saturated carbonated solution is transferred 8 to pressure chamber 9, where it is subjected to a pressure between about 1 and 10 psi, i.e., psig. This transfer results in a supersaturated carbonation and creates carbonic acid, which separates the solids from the water. Lastly, the cleaned water is placed in a second bubbling chamber 11 and $CO_2$ is bubbled through the water, which suspends fines in the water. Finally, the water, which is separated 12, passes through a small fines filter 13 to produce clean water 14.

Figure 2:
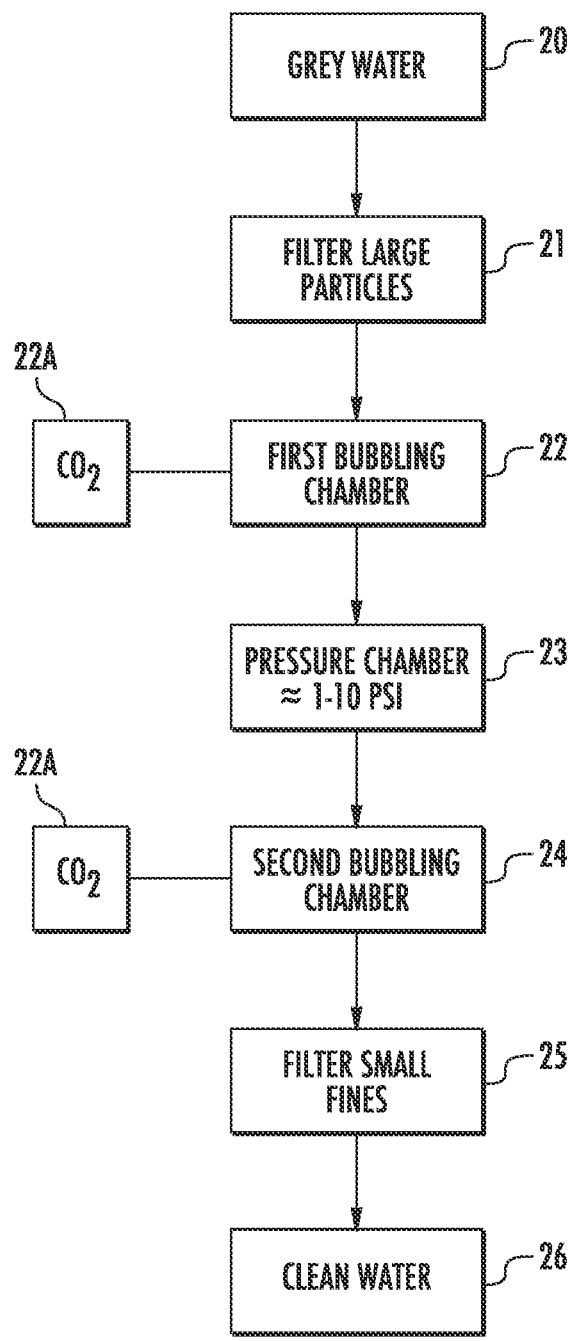
FIG. 2 is a flow chart of the method of the present invention.

FIG. 2 is a flow chart of an embodiment of the method of purification of greywater of the present invention. In this view, greywater 20 is filtered for large particles 21. The filtered greywater is placed in the first bubbling chamber 22 and $CO_2$ 22a is bubbled therein. The water is transferred to the pressure chamber 23 for supersaturation and energy to separate a majority of the solids from the carbonic acid. The water is then placed in the second bubbling chamber 24 for removal of solids. Lastly, the water is passed through a small fines filter 25 to create clean recyclable water 26.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:
1. A system for the purification of greywater comprising:
a) a large, suspended particle filter that filters particles greater or equal than 10 microns in the greywater;
b) a fines suspended particle filter that filters particles less than 10 microns in the greywater;
c) a $CO_2$ source;
d) a first bubbling chamber which is designed to receive $CO_2$ from the $CO_2$ source and greywater which has been treated to remove the suspended particles, wherein the first bubbling chamber can bubble $CO_2$ through the greywater until the greywater reaches about 6.4 pH;
e) a pressure chamber to add the about 6.4 pH greywater and keep a pressure of from about between 1 and 10 psig until the dissolved particles become suspended particles; and f) a particle filter to filter any suspended particles resulting from the pressure treatment of the greywater.

2. The system for the purification of greywater according to claim 1, wherein the $CO_2$ source is carbon-captured $CO_2$.

3. A method for the treatment of greywater comprising:
 a) filtering the greywater with one or more particle filters to remove all suspended solids in the greywater;
 b) adding the filtered greywater to a $CO_2$ bubbling chamber;
 c) using a first single pass bubbling $CO_2$ into the bubbling chamber until the filtered greywater is saturated with $CO_2$ to a pH of about 6.4 prior to entering a pressure chamber;
 d) transferring the about 6.4 pH greywater to the pressure chamber at a pressure of from about 1 to 10 psig until dissolved solids become suspended solids;
 e) transferring the pressure treated greywater and the suspended solids to a second bubbling chamber and bubbling $CO_2$ through the pressure treated greywater; and
 f) filtering the pressure treated and $CO_2$ bubbled greywater through a small fines filter.

* * * * *